US008289364B2

(12) United States Patent
Matsuda

(10) Patent No.: US 8,289,364 B2
(45) Date of Patent: Oct. 16, 2012

(54) TV WITH INTERNET VIDEOCONFERENCING

(75) Inventor: Yoshinari Matsuda, Chula Vista, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 953 days.

(21) Appl. No.: 12/350,576

(22) Filed: Jan. 8, 2009

(65) Prior Publication Data

US 2010/0171806 A1      Jul. 8, 2010

(51) Int. Cl.
   *H04N 7/14*      (2006.01)
(52) U.S. Cl. ............... 348/14.08; 348/14.04; 348/14.05; 348/14.07; 348/14.1; 348/14.12; 379/202.01; 455/416; 709/204
(58) Field of Classification Search ............ 348/14.02–9
   See application file for complete search history.

(56) References Cited

U.S. PATENT DOCUMENTS

| 5,991,276 | A  | * | 11/1999 | Yamamoto | 370/260 |
| 2006/0277584 | A1 | * | 12/2006 | Taylor | 725/112 |
| 2007/0078294 | A1 |   | 4/2007 | Jain et al. | |
| 2008/0069006 | A1 | * | 3/2008 | Walter et al. | 370/252 |
| 2009/0265764 | A1 | * | 10/2009 | Schultz et al. | 726/4 |

FOREIGN PATENT DOCUMENTS

WO      2007079469      7/2007

OTHER PUBLICATIONS

Sandra Taimre, "Estonian founders of Skype take video calls into TV", http://www.balticbusinessnews.com/Default2.aspx?ArticleID=c57ec190e-bb72-4c6d-bd17-edbb54b3657c&ref=rss, Aug. 28, 2008.

Brandon Holland, "Apple TV Hacks: Make Skype Calls Via Your Apple TV", http://www.tvsnob.com/archives/016264.php, Jan. 21, 2008.

Larry Kless Oakland, "Skype Now Broadcasting on a TV Near You", http://klessblog.blogspot.com/2008/03/skype-now-broadcasting-on-tv-near-you.html, Mar. 17, 2008.

* cited by examiner

*Primary Examiner* — Joseph J Nguyen
(74) *Attorney, Agent, or Firm* — John L. Rogitz

(57) ABSTRACT

A TV with Internet communication capability includes a built-in microphone and video camera. Signals from the microphone and video camera are processed by an IP phone module in the TV, multiplexed together, and sent over the Internet to one or more user-selected addresses. Incoming videoconferencing signals are demultiplexed and presented on the TV display and speaker.

14 Claims, 3 Drawing Sheets

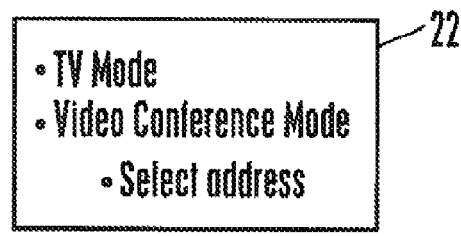
FIG. 3 (example GUI)
FIG. 4
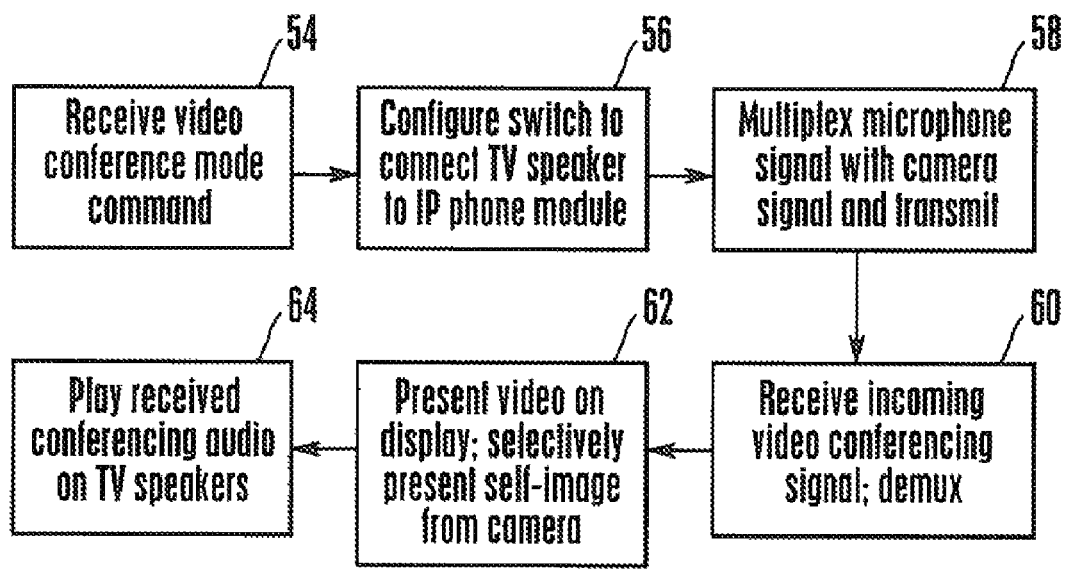

TV WITH INTERNET VIDEOCONFERENCING

FIELD OF THE INVENTION

The present application relates generally to TVs with Internet videoconferencing capability.

BACKGROUND OF THE INVENTION

Internet videoconferencing has been provided to enable mobile phone users and personal computer users to communicate with each other and see as well as hear each other. Such videoconferencing is typically convenient and inexpensive. As recognized herein, it would be advantageous to leverage the audio and video capability inherent in a TV to extend Internet videoconferencing opportunities for users.

SUMMARY OF THE INVENTION

An apparatus includes a TV chassis, a TV video display on the chassis, and one or more TV audio speakers for playing audio associated with video presented on the display. The apparatus also has a TV tuner for presenting video from a selected channel on the display. A TV processor in the chassis communicates with a wide area computer network using a network interface. A microphone and a video camera are on the chassis, and an IP phone module is in the chassis for receiving signals from the microphone and video camera. The IP phone module sends the signals to one or more recipients on the wide area network using the network interface. Incoming videoconferencing signals from the wide area network are presented on the TV video display and TV audio speaker.

In example implementations the signals from the camera and microphone are multiplexed prior to being sent over the wide area network. Also, if desired the incoming videoconferencing signals from the wide area network are demultiplexed prior to display.

A switch can be provided in the chassis for selectively connecting the speaker to a TV audio baseband circuit or to the IP phone module responsive to user selection of TV mode or videoconferencing mode, respectively. The IP phone module can include an analog baseband circuit sending signals to the switch and a digital processor communicating with the analog baseband circuit and sending signals for display on the TV display. The digital processor may receive signals from the video camera while the analog baseband circuit may receive signals from the microphone.

In another aspect, a computer-implemented method includes receiving at a TV a user command to enter a videoconferencing mode, and in response to the user command, configuring a switch to disconnect a TV audio baseband circuit from a TV speaker and to connect an IP phone module to the TV speaker.

In another aspect, a system includes TV chassis, a TV supported by the chassis, and an IP phone module supported on the chassis. Information received from the IP phone module is presented on the TV.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a schematic view of a TV display showing an example user interface from which a user may select to use the TV as a videoconferencing platform; and FIG. 4 is a flow chart of example logic for using the TV shown in FIG. 2 as a videoconferencing platform.

DETAILED DESCRIPTION OF THE PREFERRED EMBODIMENT

Figure 1:
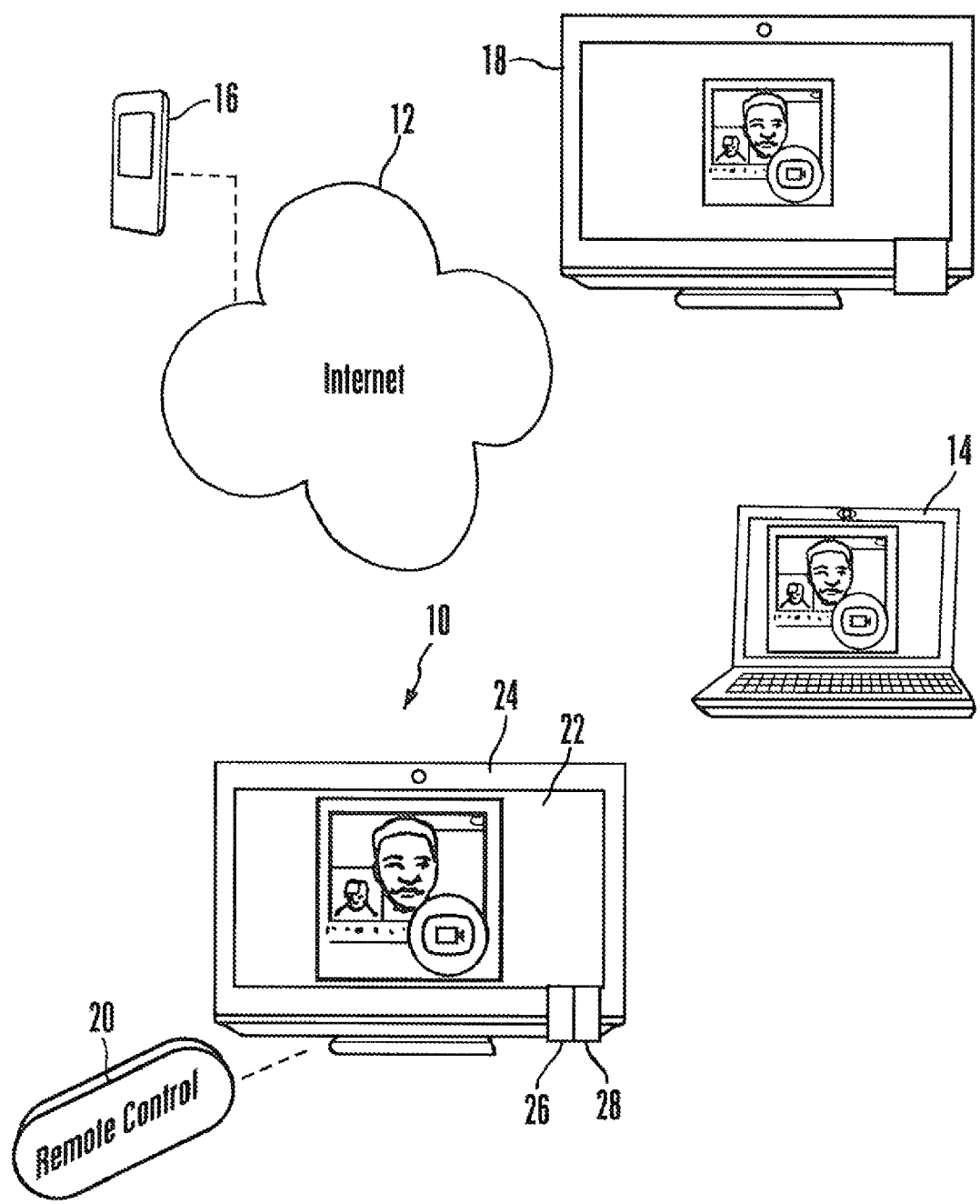
FIG. 1 is a block diagram of an example system showing example components hosting videoconferencing.

Referring initially to FIG. 1, an example TV 10 in accordance with present principles can communicate videoconferencing signals in accordance with disclosure below with a wide area network 12 such as the Internet. The TV 10 can exchange video and voice signals to other components on the network 12 including, e.g., a personal computer (PC) 14, a mobile telephone 16, and another TV 18 that is configured like the TV 10.

The TV 10 may be controlled by a user manipulating a TV remote control 20 to cause TV video, video from videoconferencing, user interfaces, etc. to be presented on a TV display 22 such as but not limited to a flat panel liquid crystal display (LCD) that is supported on a TV chassis 24. Also, one or more microphones 26 and video cameras 28 (shown in FIG. 1 as being integrated in a single videoconferencing package) are mounted on the chassis 24 for purposes to be shortly disclosed.

Figure 2:
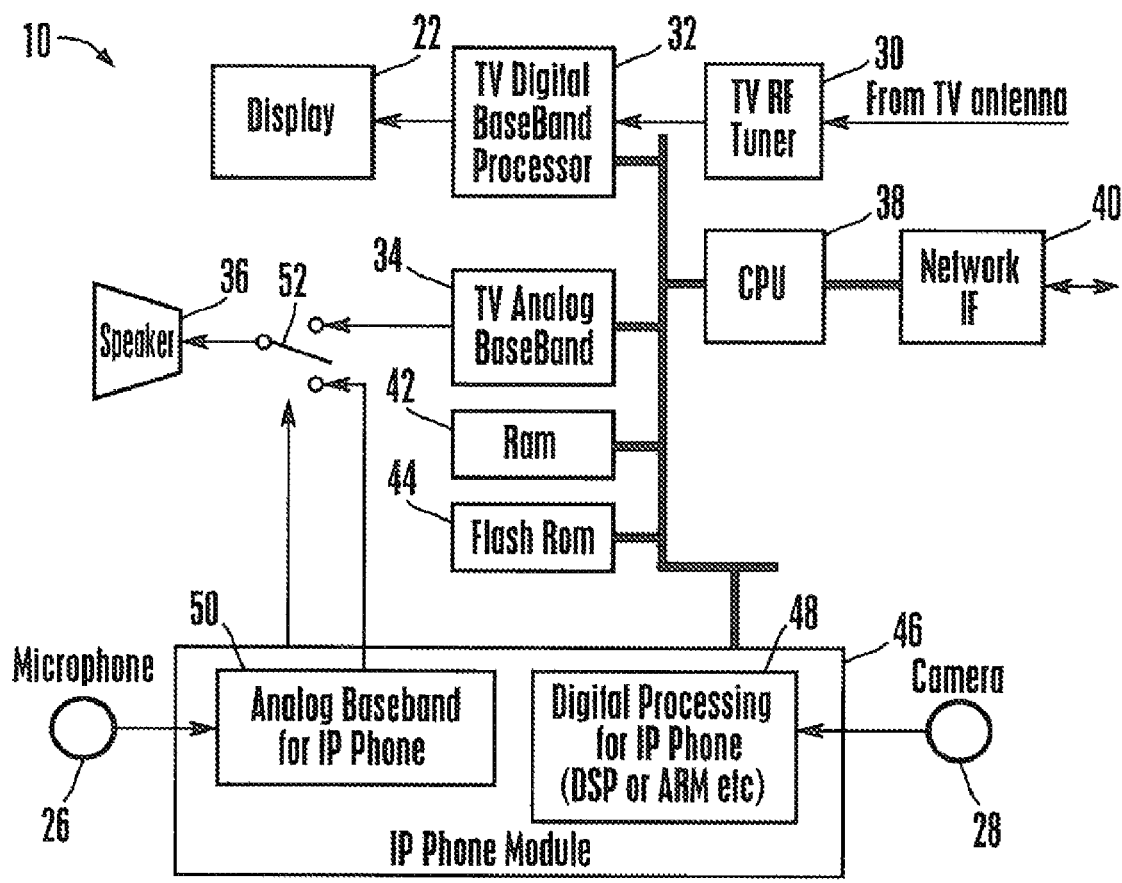
FIG. 2 is a block diagram of an example TV.

Details of the example TV 10 can be seen in FIG. 2. A TV tuner 30 receives TV signals from a source of TV signals such as a set-top box, satellite dish, cable head end, terrestrial TV signal antenna, etc. The tuner 30 may be in the chassis 24 or it may be externally located in, e.g., a set-top box. The TV signals typically include analog and digital signals, and may be presented on the display 22 in standard definition and/or high definition.

A TV processor 32 in the chassis 24 controls the display 22 to present demanded images. The TV processor 32 may also access a TV analog baseband circuit 34 to cause one or more TV speakers 36 to play audio signals in TV programming. The TV analog baseband circuit 34 may include, e.g., digital-to-analog converter circuitry, etc.

The TV processor 32 may also communicate with a network central processing unit (CPU) 38 in the chassis 24, it being understood that the CPU 38 may be omitted and its function undertaken by the TV processor 34. In any case, the CPU 38 (or TV processor 32) communicates with the wide area network 12 shown in FIG. 1 using a network interface 40 such as but limited to a modem. In some implementations the interface 40 may be a local area network (LAN) interface of, e.g., a home network of which the TV 10 is a part, with the home network in turn communicating with the Internet.

FIG. 2 also shows that the TV processor 32 may access one or more tangible computer readable storage media such as disk-based storage or solid-state storage such as but not limited to a random access memory (RAM) device 42 and a read-only memory (ROM) device 44 such as flash memory. The logic herein may be implemented on the storage media for execution thereof by one or more processors described herein.

As shown in FIG. 2, the TV processor 32 may communicate with an Internet Protocol (IP) phone module 46 which may include a digital processor 48 such as a digital signal processor (DSP). The digital processor 48 may communicate with an analog baseband circuit 50 in the IP phone module 46 as shown. The digital processor 48 may in some embodiments be integrated with the TV processor 32 and/or CPU 38.

In any case, the digital processor 48 may be programmed to execute IP videoconferencing logic in accordance with, for instance, "Skype" principles. To this end the digital processor 48 may receive input from the video camera 28 on the TV chassis, while the analog baseband circuit 50, which can include analog to digital and digital to analog conversion circuitry, can receive input from the microphone 26 on the TV chassis. Also, the digital processor 48 of the IP phone module 46 may send signals to the TV processor 32 for display of video represented by the signals on the display 22.

As shown in FIG. 2, the analog baseband circuit 50 of the IP phone module 46 may provide audio signals to a switch 52. As can readily be appreciated in reference to FIG. 2, the switch 52, which may be controlled by, e.g., the TV processor 32, connects either the TV analog baseband circuit 34 to the speaker 36 so that audio from TV programming may be played, or the switch 52 disconnects from the circuit 34 and connects the speaker 36 to the analog baseband circuit 50 of the IP phone module 46 so that audio from videoconferencing signals may be played on the speaker.

FIG. 3 shows that a user interface may be presented on the TV display 22 permitting a person to select a TV mode or other modes, as well as an IP videoconferencing mode. The latter mode may include a sub-selection allowing a user to enter, by means of, e.g., the remote control 20 shown in FIG. 1, an address or phone number of a recipient with whom videoconferencing is to be established.

FIG. 4 shows that when a user command is received at block 54 invoking the videoconferencing mode, the logic moves to block 56 to configure the switch 52 to connect the IP phone module 46 to the TV speaker(s) 36. If not already activated, the video camera 28 on the TV chassis is activated.

Proceeding to block 58, signals received from the microphone 26 may be multiplexed by the IP phone module 46 with signals received from the video camera 28 and sent through the CPU 38 and network interface 40 over the wide area network 12 to one or more recipients as designated by the user. Also, at block 60 an incoming videoconferencing signal is received from a sending videoconferencing node in the network 12 through the network interface 40 and CPU 38 and provided to the IP phone module 46, where video is demultiplexed from audio. The video is sent from the digital processor 48 to the TV processor 32 for presentation of the video on the TV display 22, while the audio is sent from the audio baseband circuit 50 of the IP phone module 46 through the switch 52 to the speaker(s) 36 for playing thereof at block 64.

Also, if desired a self-image, i.e., the image from the TV-mounted video camera 28, may be presented on the display 22, along with the image received from a sending node on the network. In this latter regard a picture-in-picture presentation may be used.

While the particular TV WITH INTERNET VIDEOCONFERENCING is herein shown and described in detail, it is to be understood that the subject matter which is encompassed by the present invention is limited only by the claims.

What is claimed is:

1. Apparatus comprising:
   TV chassis;
   a TV video display on the chassis;
   at least one TV audio speaker for playing audio associated with video presented on the display;
   at least one TV tuner for presenting video from a selected channel on the display;
   at least one TV processor in the chassis and communicating with a wide area computer network using a network interface;
   a microphone on the chassis;
   a video camera on the chassis;
   an IP phone module in the chassis receiving signals from the microphone and video camera, the IP phone module sending the signals to one or more recipients on the wide area network using the network interface;
   incoming videoconferencing signals from the wide area network being presented on the TV video display and TV audio speaker, wherein a self-image from the video camera is presented on at least a portion of the video display in a picture-in-picture presentation, and further comprising a switch in the chassis selectively connecting the speaker to a TV audio baseband circuit or to the IP phone module responsive to user selection of TV mode or videoconferencing mode, respectively, wherein the IP phone module includes an analog baseband circuit sending signals to the switch and a digital processor communicating with the analog baseband circuit and sending signals for display on the TV display.

2. The apparatus of claim 1, wherein the signals from the camera and microphone are multiplexed prior to being sent over the wide area network.

3. The apparatus of claim 1, wherein the incoming videoconferencing signals from the wide area network are demultiplexed prior to display.

4. The apparatus of claim 1, wherein the digital processor receives signals from the video camera.

5. The apparatus of claim 1, wherein the analog baseband circuit receives signals from the microphone.

6. Computer-implemented method comprising:
   receiving at an audio video display device (AVDD) a user command to enter a videoconferencing mode; and
   in response to the user command, configuring a switch to disconnect a AVDD audio baseband circuit from an AVDD speaker and to connect an IP phone module to the AVDD speaker, wherein the AVDD includes:
   a video display on a chassis;
   at least one AVDD processor in the chassis and communicating with a wide area computer network using a network interface;
   a microphone on the chassis;
   a video camera on the chassis;
   the IP phone module receiving signals from the microphone and video camera, the IP phone module sending the signals to one or more recipients on the wide area network using the network interface;
   incoming videoconferencing signals from the wide area network being presented on the video display and AVDD audio speaker, wherein the IP phone module includes an analog baseband circuit sending signals to the switch and a digital processor communicating with the analog baseband circuit and sending signals for display.

7. The method of claim 6, wherein the signals from the camera and microphone are multiplexed prior to being sent over the wide area network.

8. The method of claim 6, wherein the incoming videoconferencing signals from the wide area network are demultiplexed prior to display.

9. The method of claim 6, wherein the digital processor receives signals from a video camera.

10. The method of claim 6, wherein the analog baseband circuit receives signals from a microphone.

11. System comprising:
    chassis;
    an audio video display device (AVDD) supported by the chassis; and an IP phone module supported on the chassis, information received from the IP phone module being presented on the AVDD;
a video display on the chassis;
at least one audio speaker for playing audio associated with video presented on the display;
at least one TV tuner for presenting video from a selected channel on the display;
at least one processor in the chassis and communicating with a wide area computer network using a network interface;
a microphone on the chassis;
a video camera on the chassis;
the IP phone module receiving signals from the microphone and video camera, the IP phone module sending the signals to one or more recipients on the wide area network using the network interface;
incoming videoconferencing signals from the wide area network being presented on the video display and audio speaker; and
a switch in the chassis selectively connecting the speaker to an AVDD audio baseband circuit or to the IP phone module responsive to user selection of AVDD mode or videoconferencing mode, respectively, wherein the IP phone module includes a baseband circuit sending signals to the switch and a digital processor communicating with the baseband circuit and sending signals for display on the display.

12. The system of claim 11, wherein the signals from the camera and microphone are multiplexed prior to being sent over the wide area network, incoming videoconferencing signals from the wide area network being demultiplexed prior to display.

13. The system of claim 11, wherein the digital processor receives signals from the video camera and the analog baseband circuit receives signals from the microphone.

14. The system of claim 11, wherein a self-image from the video camera is presented on at least a portion of the video display.

* * * * *